(12) United States Patent
Egawa

(10) Patent No.: US 7,068,317 B1
(45) Date of Patent: Jun. 27, 2006

(54) PHOTOELECTRIC CONVERSION APPARATUS

(75) Inventor: Akira Egawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/512,032

(22) Filed: Feb. 24, 2000

(30) Foreign Application Priority Data

Feb. 26, 1999 (JP) ................................ 11-051649

(51) Int. Cl.
*H04N 3/14* (2006.01)

(52) U.S. Cl. ...................... 348/318; 348/135; 348/139; 348/240.99; 348/348; 396/80; 396/106; 396/139

(58) Field of Classification Search ........... 348/240.99, 348/211.9, 348, 135, 139, 318; 396/106, 396/80, 139
See application file for complete search history.

(56) References Cited

U.S. PATENT DOCUMENTS 5,808,726 A * 9/1998 Egawa et al. ............... 356/3.06
5,848,305 A * 12/1998 Takasaki ....................... 396/96
5,850,282 A * 12/1998 Egawa ......................... 356/3.08
6,035,138 A * 3/2000 Egawa ......................... 396/106

FOREIGN PATENT DOCUMENTS

JP  8-233571  9/1996
JP  9-222553  8/1997

* cited by examiner

*Primary Examiner*—David Ometz
*Assistant Examiner*—Chriss Yoder
(74) *Attorney, Agent, or Firm*—Fitzpatrick, Cella, Harper & Scinto

(57) ABSTRACT

This invention is to decrease the sensor pitch, prevent saturation by external light, accurately determine skimming, simplify skimming determination, and prevent any difference in influence of the transfer efficiency between the ON and OFF states. For this purpose, a distance measuring apparatus includes a light projection section for projecting light to an object, a sensor array for receiving reflected light from the object, a first transfer section for transferring charges from the sensor array, and a ring-shaped second charge transfer section for integrating the charges from the first transfer section, wherein the first charge transfer section transfers charges in a light projection ON state and charges in a light projection OFF state at a timing, the transfer frequency of the second charge transfer section is twice that of the first charge transfer section, and the timing of the first charge transfer section has a phase different from that of the second charge transfer section.

4 Claims, 10 Drawing Sheets

FIG. 7

| | a4 → | a3 → | a2 → | a1 → | b8 → | b7 → | b6 → | b5 → | b4 → | b3 → | b2 → | b1 |
|---|---|---|---|---|---|---|---|---|---|---|---|---|
| t1 | S4 ON | S3 ON | S2 ON | S1 ON | | | | | | | | |
| t2 | | S4 ON | S3 ON | S2 ON | S1 ON | | | | | | | |
| t3 | | S4 ON | S3 ON | S2 ON | | S1 ON | | | | | | |
| t4 | | | S4 ON | S3 ON | S2 ON | | S1 ON | | | | | |
| t5 | | | S4 ON | S3 ON | | S2 ON | | S1 ON | | | | |
| t6 | | | | S4 ON | S3 ON | | S2 ON | | S1 ON | | | |
| t7 | | | | S4 ON | | S3 ON | | S2 ON | | S1 ON | | |
| t8 | | | | | S4 ON | | S3 ON | | S2 ON | | S1 ON | |
| t9 | S4 OFF | S3 OFF | S2 OFF | S1 OFF | S4 ON | | S3 ON | | S2 ON | | S1 ON | |
| t10 | | S4 OFF | S3 OFF | S2 OFF | S1 OFF | S4 ON | | S3 ON | | S2 ON | | S1 ON |
| t11 | | S4 OFF | S3 OFF | S2 OFF | S1 ON | S1 OFF | S4 ON | | S3 ON | | S2 ON | |
| t12 | | | S4 OFF | S3 OFF | S2 OFF | S1 ON | S1 OFF | S4 ON | | S3 ON | | S2 ON |
| t13 | | | S4 OFF | S3 OFF | S2 ON | S2 OFF | S1 ON | S1 OFF | S4 ON | | S3 ON | |
| t14 | | | | S4 OFF | S3 OFF | S2 ON | S2 OFF | S1 ON | S1 OFF | S4 ON | | S3 ON |
| t15 | | | | S4 OFF | S3 ON | S3 OFF | S2 ON | S2 OFF | S1 ON | S1 OFF | S4 ON | |
| t16 | | | | | S4 OFF | S3 ON | S3 OFF | S2 ON | S2 OFF | S1 ON | S1 OFF | S4 ON |
| t17 | | | | | S4 ON | S4 OFF | S3 ON | S3 OFF | S2 ON | S2 OFF | S1 ON | S1 OFF |
| t'1 | S4 ON | S3 ON | S2 ON | S1 ON | S1 OFF | S4 ON | S4 OFF | S3 ON | S3 OFF | S2 ON | S2 OFF | S1 ON |
| t'2 | | S4 ON | S3 ON | S2 ON | S1 ON | S1 OFF | S4 ON | S4 OFF | S3 ON | S3 OFF | S2 ON | S2 OFF |

PHOTOELECTRIC CONVERSION APPARATUS

BACKGROUND OF THE INVENTION

1. Field of the Invention

The present invention relates to a photoelectric conversion apparatus used for, e.g. auto-focusing of a camera.

2. Related Background Art

Normally, to measure the distance to an object, spot light is projected to the object, and triangulation is performed by receiving reflected light. In this case, the spot light is projected to the object from a light-emitting diode through a projecting lens, and the reflected light is received by the position detection element of a photoelectric conversion element through a light-receiving lens. The position detection element serving as a line sensor outputs signals A and B corresponding to the light-receiving position from two terminals of the position detection element. For this reason, the light-receiving position of the position detection element can be detected, and the distance to the object can be known from the light-receiving position.

An example of the distance measuring apparatus is disclosed in Japanese Laid-Open Patent Application No. 8-233571 in which outputs from a sensor array are independently stored and transferred upon detecting reflected light in accordance with ON/OFF of projection of IRED (infrared) light.

According to this prior art, in the distance measuring apparatus which projects light to an object to perform triangulation, for easy control of a pulse that determines the timing of charge transfer from the sensor array to a linear CCD connected to a ring CCD for integrating signal charges, signal charges generated in each sensor block in the light projection OFF state are transferred to the second storage section, and signal charges generated in each sensor block in the light projection ON state are transferred to the first storage section. These storage sections adjust the timing and parallelly simultaneously transfer the charges obtained in the light projection OFF state and those obtained in the light projection ON state to each CCD stage of the linear CCD.

Japanese Laid-Open Patent Application No. 9-222553 discloses an apparatus in which storage means for storing charges photoelectrically converted by a sensor array are arranged on both sides of the sensor array, and a charge transfer means is provided on the sensor array. The apparatus described in this prior art comprises a light projection means for projecting light to a distance measurement object, a sensor array having an array of a plurality of sensors for receiving reflected light from the distance measurement object and photoelectrically converting the light, a plurality of storage means, arranged in units of the plurality of sensors, for storing output charges from the sensors, and a charge transfer means for a ring CCD at least partially having a ring-connected shape, to which the charges stored in the plurality of storage means are parallelly supplied, and the plurality of storage means are arranged on both sides of the sensor array along the array direction of the sensor array.

FIG. 1 is a view for explaining the prior art. Referring to FIG. 1, a sensor S has pixels S1 to S4. An electronic shutter ICG also serves as an overflow. A storage means ST1 stores charges in the light projection OFF state. A means ST2 stores charges in the light projection ON state. A shift gate SH transfers charges to a charge transfer stage CCD constructed by CCDs a'1 to a'8. A transfer stage CCD constructed by CCDs b1 to b8 has a ring-shaped portion and integrates stored charges by circulating them.

A skimming means SKIM is provided at the ring-shaped portion of the transfer stage CCD to discard predetermined amount of charges. An amplification section FG converts the charge amount into a voltage and outputs the voltage by the signal output section. A clearing means CCDCLR initializes the CCDs.

As a distance measuring apparatus, another light-receiving portion including a ring CCD shown in FIG. 1 is prepared at a target position, and the distance to the object can be measured by triangulation on the basis of the difference from the output from the amplification section FG. From the measurement result, the position of an objective lens can be specified by, e.g., auto-focusing.

FIG. 2 is a timing chart showing operation timings and signal states. IRED is an ON/OFF-control signal of the light projection means for projecting infrared light. One period of the signal IRED is synchronized with one round of the ring CCD transfer means. Charges stored in the storage means ST1 and ST2 in the light projection OFF and ON states are simultaneously transferred by the shift gates SH.

FIG. 4 shows the flow of charges in the transfer stages a'1 to a'8 and b1 to b8 at times t1 to t9 and t'1.

At time t1, charges Sn=OFF and Sn=ON stored in the storage means ST1 and ST2 of the sensors are transferred to the charge transfer stages a'1 to a'8 by the shift gates SH.

At times t2 to t9, the charges are sequentially transferred to the charge transfer stages b1 to b8. At time t9, all the charges in the charge transfer stages a'1 to a'8 are transferred to the ring transfer means b1 to b8.

At time t'1, charges from the sensors are transferred, like at time t1, and simultaneously, all charges are transferred to the ring transfer means b1 to b8.

By repeating this operation, charges are accumulated in the charge transfer stages b1 to b8.

The charge transfer stages a'1 to a'8 and b1 to b8 are controlled by driving pulses having the same frequency.

FIGS. 3A and 3B explain the operation of the skimming means. (1) to (4) are timings. FIG. 3A shows an operation of discarding a predetermined charge amount. FIG. 3B shows an operation of inhibiting to discard the predetermined charge amount.

Referring to FIGS. 3A and 3B, a means 81 measures the predetermined charge amount. A charge transfer means 82 receives charges overflowed from the measuring means 81, which is identical to the skimming means SKIM and charge transfer stage b7 shown in FIG. 1.

At (1), charges are transferred to the charge transfer stage b8. The charges are transferred to the measuring means 81 at (2). Overflowed charges are stored in the transfer means 82.

At (2), if the charge transfer means 82 has a charge amount, it means that a predetermined charge amount is measured by the measuring means 81. At (3), the predetermined charge amount is discarded by the clearing means CLR.

Whether the charges are to discarded is determined on the basis of the charge amount in the light projection OFF state. Whether charges stored in the light projection ON state, which are paired with charges in the light projection OFF state of each sensor, are to be discarded complies with the determination for the OFF state. This is because the discarding operation is performed for only charges corresponding to external light.

This also applies to FIG. 3B. Since no charges are stored in the transfer means 82 at (3), the charge amount in the measuring means 81 is smaller than the predetermined amount. Hence, the charges in the measuring means 81 are not discarded by the clearing means CLR but transferred to the charge transfer stage b6.

At (4), charges in the measuring means 81 and transfer means 82 are added and transferred to the transfer stage b6.

In the prior art, however, the storage sections for the light projection ON and OFF states must be independently prepared per pixel. In addition, two stages of charge transfer means are required per pixel for the ON and OFF states. This results in the limited sensor pitch and impedes size reduction of the apparatus.

SUMMARY OF THE INVENTION

It is an object of the present invention to realize a compact apparatus.

In order to achieve the above object, according to an aspect of the present invention, there is provided a photoelectric conversion apparatus comprising:

a sensor array for receiving reflected light from an object;

first transfer means for transferring a signal from the sensor array; and ring-shaped second transfer means for integrating the signal from the first transfer means, wherein the first charge transfer means transfers a first signal from the sensor array in a light projection ON state and a second signal from the sensor array in a light projection OFF state at a predetermined timing, and a transfer frequency of the second transfer means is higher than that of the first transfer means.

According to another aspect, there is provided a distance measuring apparatus comprising:

light projection means for projecting light to an object;

a plurality of sensor arrays for receiving reflected light from the object;

a plurality of first transfer means for transferring signals from the plurality of sensor arrays, respectively;

a plurality of second transfer means for integrating the signals from the plurality of first transfer means, respectively, wherein each of the first transfer means transfers a first signal from the sensor array in a light projection ON state and a second signal from the sensor array in a light projection OFF state at a predetermined timing, and a transfer frequency of each of the second transfer means is higher than that of each of the first transfer means; and distance measuring means for measuring a distance using a difference signal between the first signal and the second signal output from the plurality of second transfer means.

According to still another aspect, there is provided a photoelectric conversion apparatus comprising:

a sensor array for receiving reflected light from an object;

first transfer means for transferring a signal from the sensor array;

ring-shaped second transfer means for integrating the signal from the first transfer means; and driving means for controlling to transfer a first signal from the sensor array in a light projection ON state and a second signal from the sensor array in a light projection OFF state to the second transfer means through the first transfer means;

wherein after the first signal is transferred from the first transfer means, the driving means transfers the second signal to the first transfer means.

According to still another aspect, there is provided a distance measuring apparatus comprising:

a plurality of sensor arrays for receiving reflected light from an object;

a plurality of first transfer means for transferring signals from the plurality of sensor arrays, respectively;

a plurality of ring-shaped second transfer means for integrating the signals from the plurality of first transfer means, respectively;

driving means for controlling to transfer a first signal from the sensor array in a light projection ON state and a second signal from the sensor array in a light projection OFF state to the second transfer means through the first transfer means; and distance measuring means for measuring a distance using a difference signal between the first signal and the second signal output from the plurality of second transfer means, wherein after the first signal is transferred from the first transfer means, the driving means transfers the second signal to the first transfer means.

The other objects, features, and advantages will be apparent from the following detailed description in conjunction with the accompanying drawings.

BRIEF DESCRIPTION OF THE DRAWINGS

FIG. 7 is a view for explaining the operation in FIG. 5 of the present invention;

DESCRIPTION OF THE PREFERRED EMBODIMENTS

Figure 5:
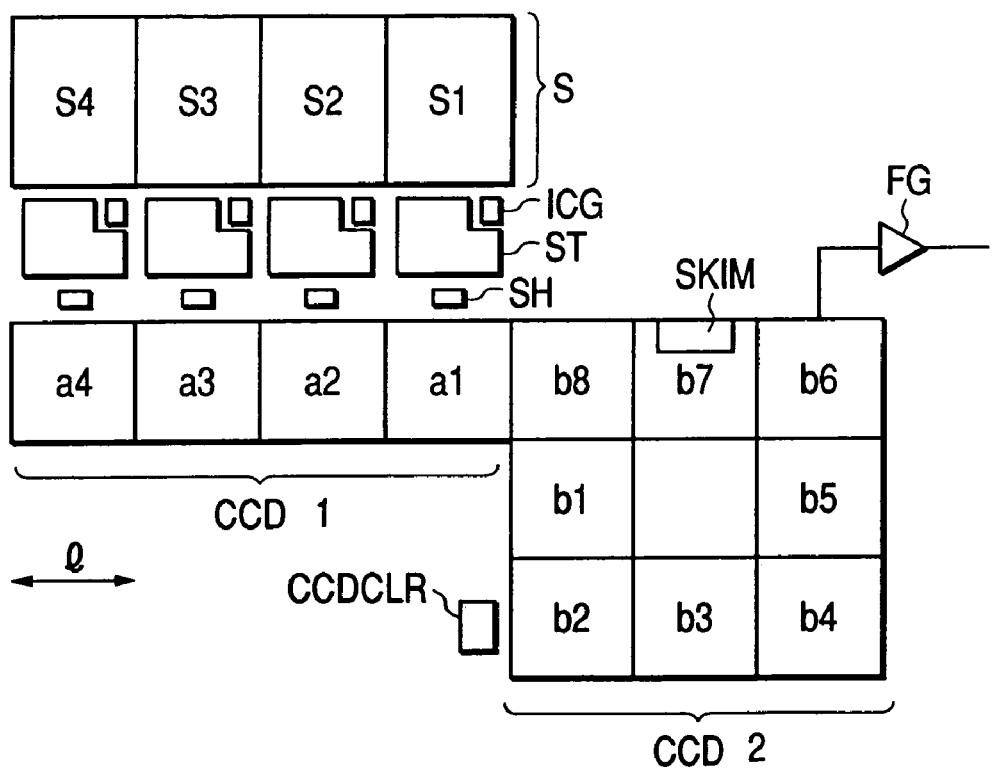
FIG. 5 is a view for explaining the arrangement of the first embodiment of the present invention.

FIG. 5 is a view that best illustrates the characteristic feature of the first embodiment of the present invention. The same reference numerals as in FIG. 1 denote the same parts in FIG. 5. Referring to FIG. 5, a sensor S has pixels S1 to S4. An electronic shutter ICG controls the signal charge amount from each sensor block. A storage means ST stores charges in the light projection OFF and ON states. A shift gate SH transfers charges to a charge transfer stage CCD 1 constructed by CCDs a1 to a4. A transfer stage CCD 2 constructed by CCDs b1 to b8 has a ring-shaped portion and integrates stored charges by circulating them.

In the storage means ST, projection light ON/OFF means projecting light/stopping projecting light from e.g., an infrared light projection means (not shown) to an object. These timings correspond to light-receiving ON and OFF timings according to the light amount of each sensor.

A skimming means SKIM is provided at the ring-shaped portion of the transfer stage CCD to discard predetermined amount of charges. An amplification section FG converts the charge amount into a voltage and outputs the voltage by the signal output section. A clearing means CCDCLR initializes the CCDs.

Figure 1:
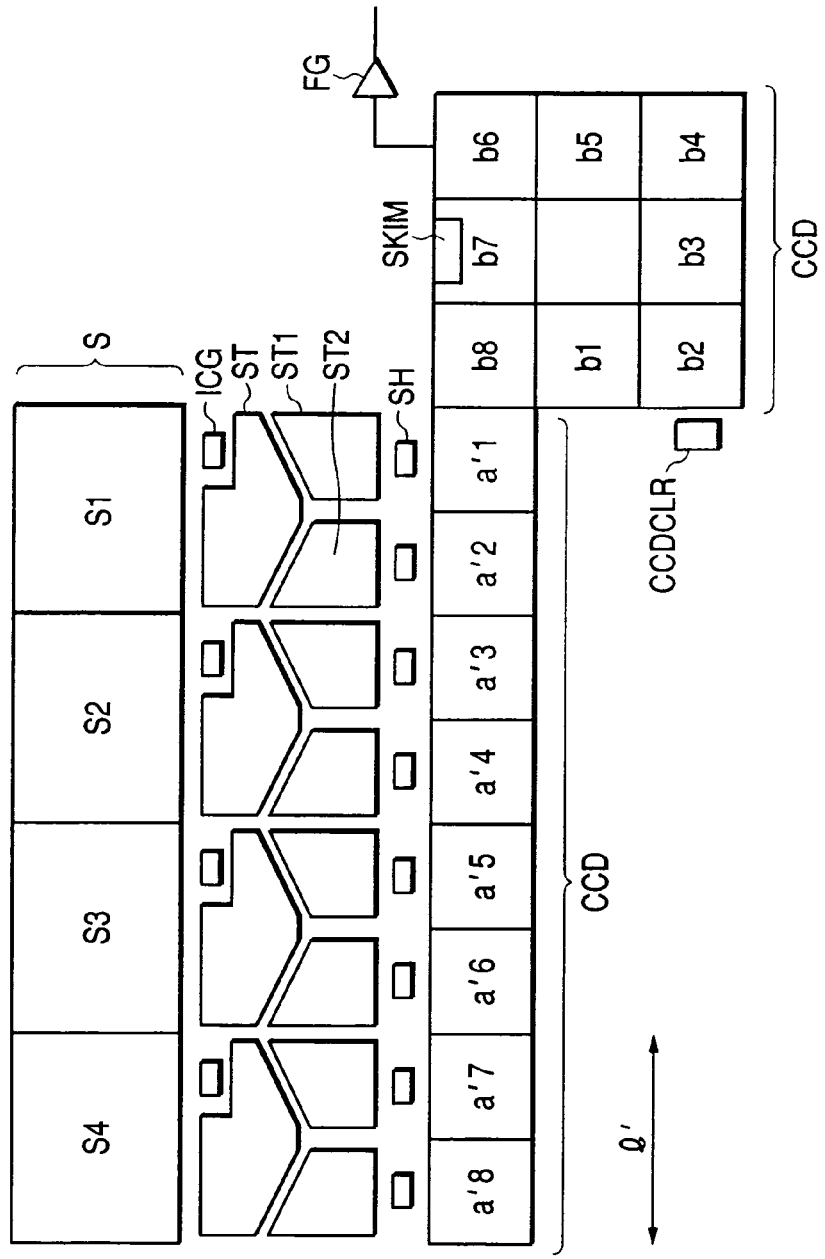
FIG. 1 is a view for explaining a conventional arrangement.

As a distance measuring apparatus, another light-receiving portion including a ring CCD shown in FIG. 1 is prepared at a target position, and the distance to an object can be measured by triangulation on the basis of the difference from the output from the amplification section FG. From the measurement result, the position of an objective lens in e.g., auto-focusing can be specified.

Unlike FIG. 1, the storage sections ST1 and ST2 are unnecessary. In addition, as for the pitch of the sensor S, the number of stages of the transfer stages is changed from two to four.

The transfer stage CCD is separated into a first transfer stage CCD1 and second transfer stage CCD2, which are driven by different driving pulses. The second transfer stage CCD2 has a ring shape.

The operation of the present invention will be described plainly with reference to FIG. 6.

Figure 2:
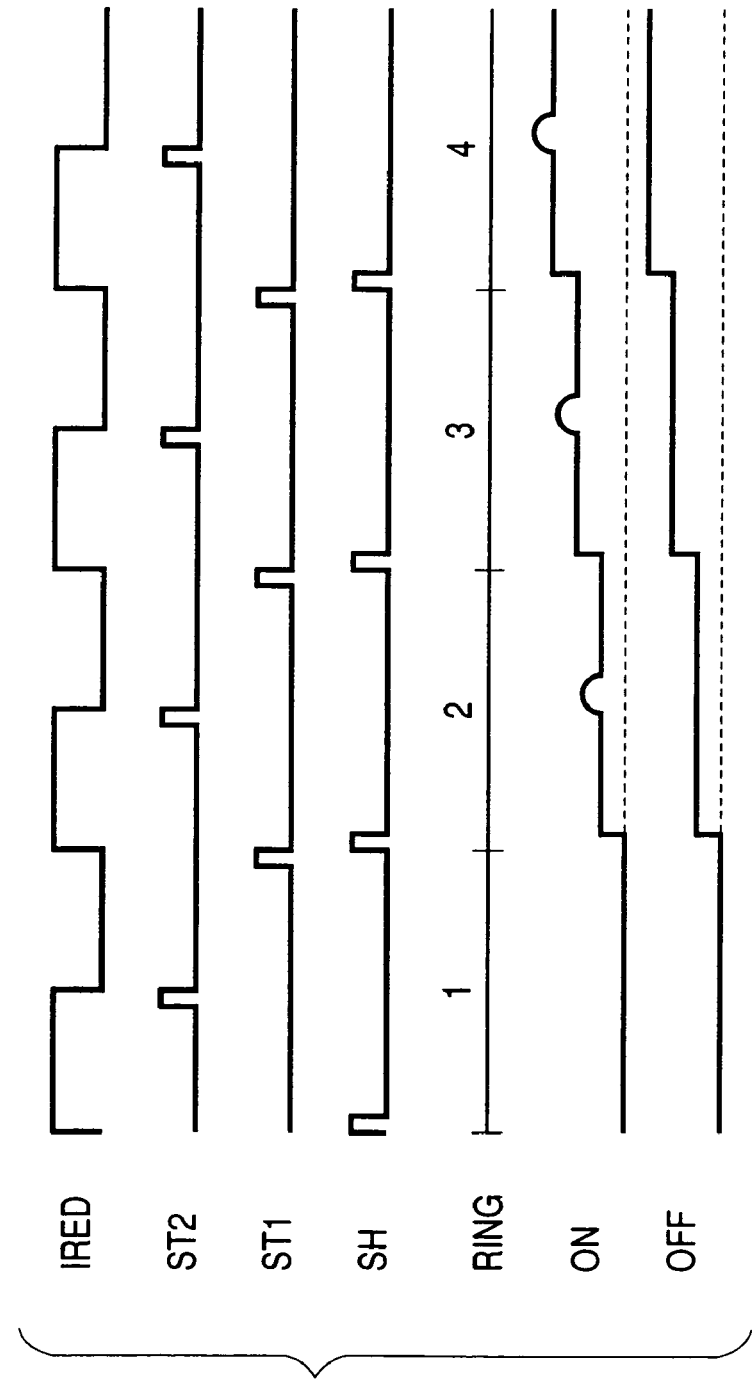
FIG. 2 is a timing chart for explaining a conventional operation.
Figure 3A:
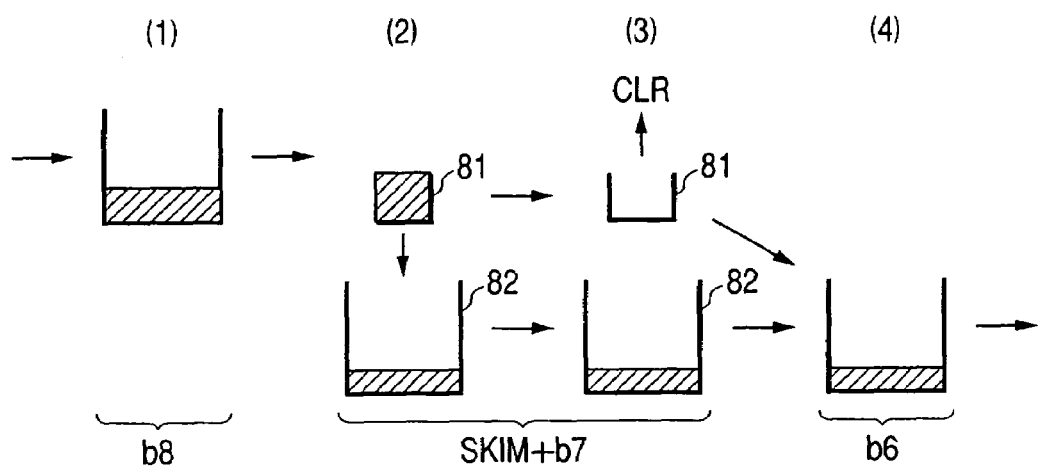
FIGS. 3A and 3B are views for explaining the operation of a skimming means.
Figure 3B:
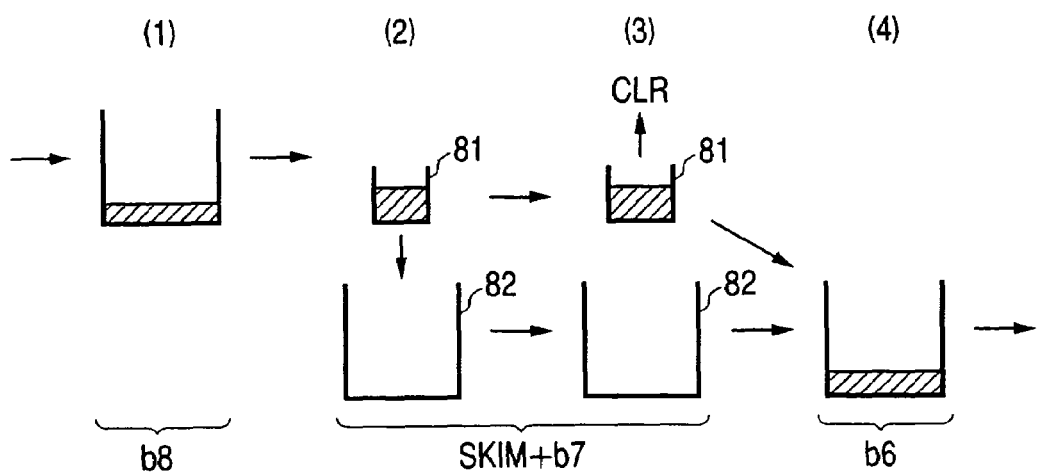
Figure 4:
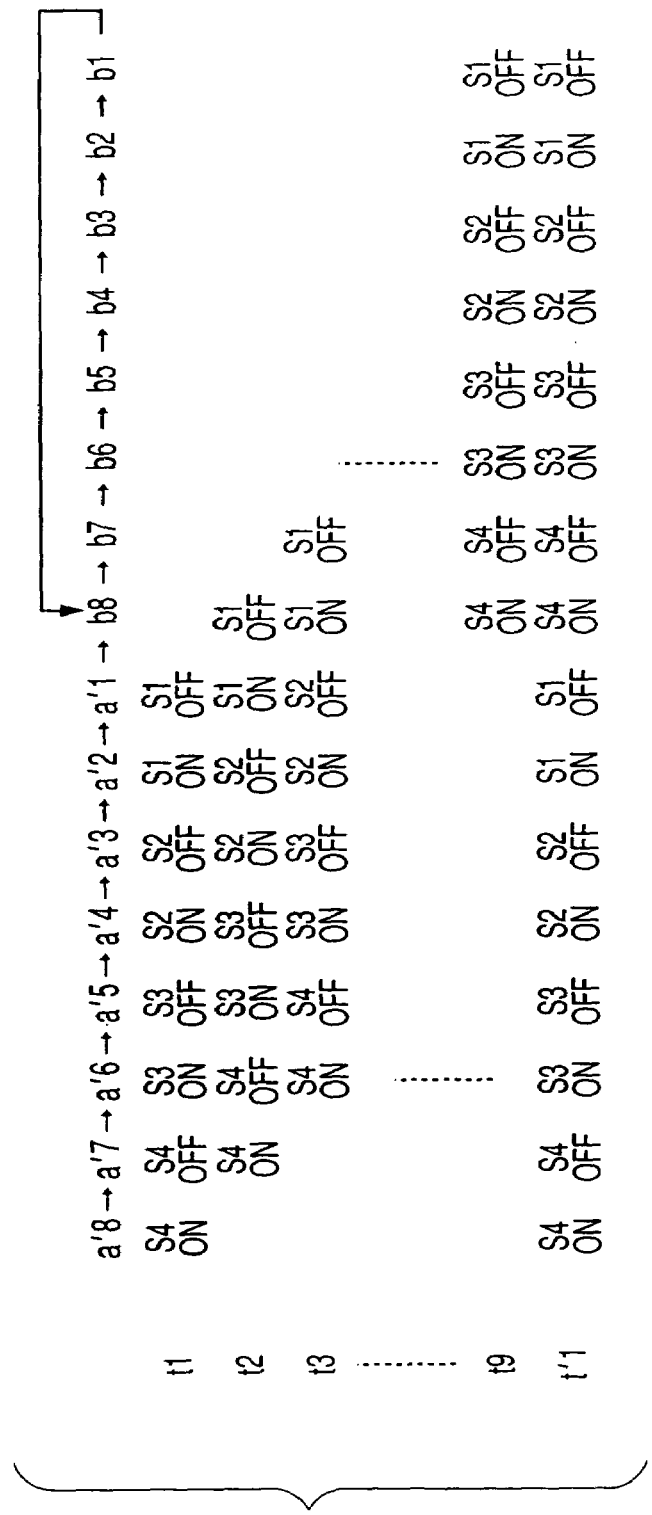
FIG. 4 is a view for explaining the operation in FIG. 2.

The largest difference from FIG. 2 is that one period of a signal IRED of light projection ON/OFF corresponds not to one round of the ring but to two rounds of the ring.

That is, charge transfer is time-serially performed every round of the ring for each of the light projection ON and OFF states, unlike the prior art in which charges in the light projection ON and OFF states are simultaneously transferred.

This is because ON or OFF signals are continuously transferred on the first transfer stage CCD1, and when the signals are transferred to the second transfer stage CCD2, they are transferred to every other stage of the second transfer stage CCD2.

To transfer signals to every other stage, the frequency of the transfer clock pulse of the second transfer stage CCD2 is set to be twice that of the first transfer stage CCD1.

More specifically, ON signals stored during the first round of the ring enter the even-numbered stages of the second transfer stage CCD2 to every other stage in the second round of the ring. OFF signals stored during the second round of the ring enter the odd-numbered stages of the second transfer stage CCD2 to every other stage in the third round of the ring. To transfer the signals to the odd- or even-numbered stages, the phase of the transfer clock is controlled by the first transfer stage CCD1 and second transfer stage CCD2.

FIG. 7 shows the flow of charges in the transfer stages a1 to a4 and b1 to b8 at times t1 to t17, t'1, and t'2.

At time t1, charges Sn ON from the sensors in the light projection ON state are transferred to the first charge transfer stage CCD1 by the shift gates SH.

At times t2 to t8, the charges are transferred from the first transfer stage CCD1 to the second transfer stage CCD2. The charges are transferred to every other stage of the second transfer stage CCD2.

At time t9, charges Sn OFF in the light projection OFF state are transferred to the first transfer stage CCD1 by the shift gates SH.

At times t10 to t17, the OFF charges are transferred to the second transfer stage CCD2. The charges are transferred to positions before the ON charges paired with the OFF charges of the corresponding sensor and between the Sn ON pixels. The operation at time t'1 is the same as at time t1.

Figure 6:
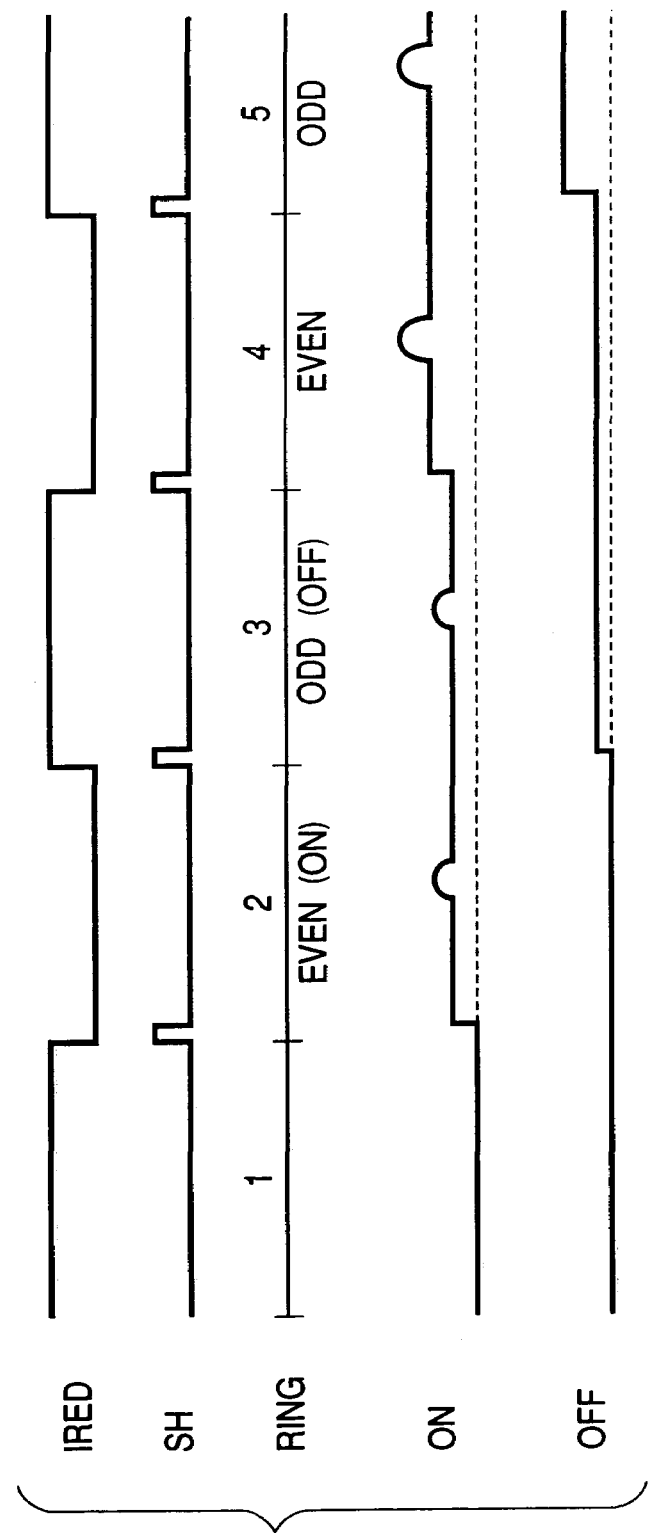
FIG. 6 is a timing chart for explaining the operation of the first embodiment of the present invention.
Figure 8:
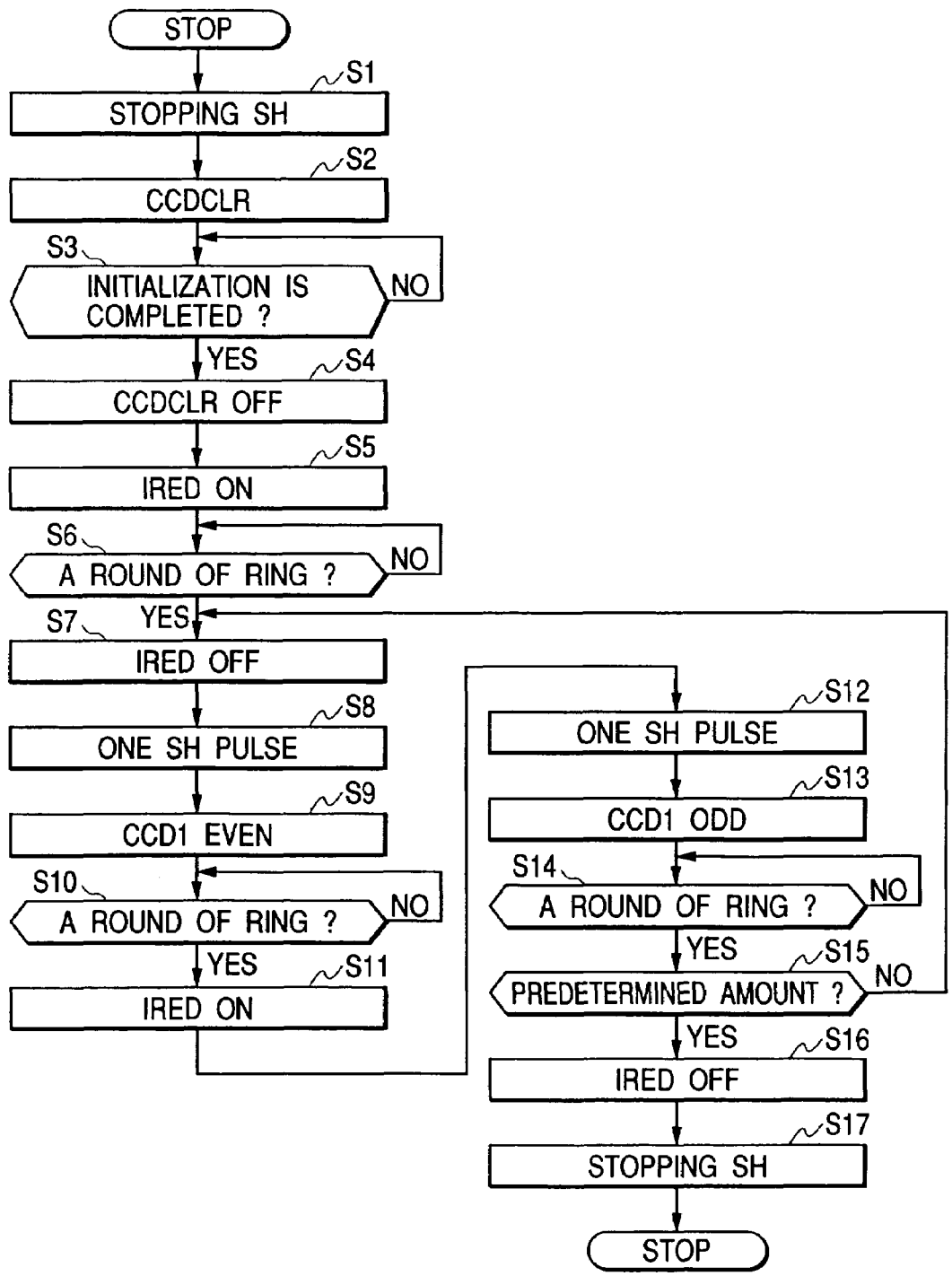
FIG. 8 is a flow chart of the first embodiment of the present invention.

FIG. 8 is a control flow chart of the first embodiment shown in FIG. 6.

In step S1, the shift gate pulse of the shift gate SH is stopped to inhibit charge transfer to the charge transfer stage CCD1, and the flow advances to step S2.

In step S2, charges in the first and second charge transfer stages CCD1 and CCD2 are cleared and initialized by the clearing means CCDCLR in the second charge transfer stage CCD2 that constructs the ring, and the flow advances to step S3.

In step S3, it is determined whether the charge transfer stages CCD1 and CCD2 are sufficiently initialized, and the flow advances to step S4. Whether sufficient initialization is performed may be determined on the basis of the number of rounds of the ring or the output from the amplification section FG.

In step S4, the clearing means CCDCLR is turned off, and the flow advances to step S5.

In step S5, a light projection means (e.g., an infrared light-emitting element IRED) (not shown) is turned on to project light to the object, and the flow advances to step S6.

In step S6, it is determined that the ring CCD2 has been driven by one round. If YES in step S6, the flow advances to step S7.

In step S7, the light projection means is turned off, and the flow advances to step S8. At this time, the light projection ON signals and external light are being stored in the storage means ST. This operation corresponds to the first round of the ring shown in FIG. 6.

In step S8, one pulse is supplied to the shift gates SH to transfer the charges from the storage section ST to the first charge transfer stage CCD1, and the flow advances to step S9. This operation corresponds to time t1 in FIG. 7.

In step S9, since the second charge transfer stage CCD2 that constructs the ring is always driven by the transfer clock at a predetermined period, the first charge transfer stage CCD1 is driven such that the charges are transferred from the first transfer stage CCD1 to the even-numbered stages of the second transfer stage CCD2 at that period, and the flow advances to step S10.

In step S10, it is determined whether the ring has been driven by one round. If YES in step S10, the flow advances to step S11. When processing waits for one round, all charges are transferred to the second charge transfer stage CCD2. This operation corresponds to the second round of the ring shown in FIG. 6, i.e., times t2 to t8 in FIG. 7.

In step S11, the light projection means is turned on again, and the flow advances to step S12.

In step S12, one pulse is supplied to the shift gates to transfer charges from the storage section ST to the charge transfer stage CCD1, as in step S8, and the flow advances to step S13. This operation corresponds to time t9 in FIG. 7.

In step S13, the charge transfer stage CCD1 is driven to transfer charges from the first charge transfer stage CCD1 to the odd-numbered transfer stages of the second charge transfer stage CCD2 at the period of the ring, as in step S9, and the flow advances to step S14.

In step S14, processing waits for one round of the ring, as in step S10, and the flow advances to step S15. This operation corresponds to times t10 to t17 in FIG. 7. This corresponds to the third round of the ring. At this time, both the light projection ON and OFF signals are stored.

In step S15, only charges of external light in the odd-numbered stages are subtracted from charges of projection light signals and external light in the even-numbered stages to determine whether the charges of light projection signals have reached a predetermined amount. If YES in step S15, the flow advances to step S16. If NO in step S15, the flow returns to step S7 to continue integration by the ring.

In step S16, the light projection means is turned off, and the flow advances to step S17.

In step S17, the shift gates SH are stopped such that no charges are stored.

With the above operation, the signals are stored in the charge transfer stage of the ring CCD2.

Figure 10:
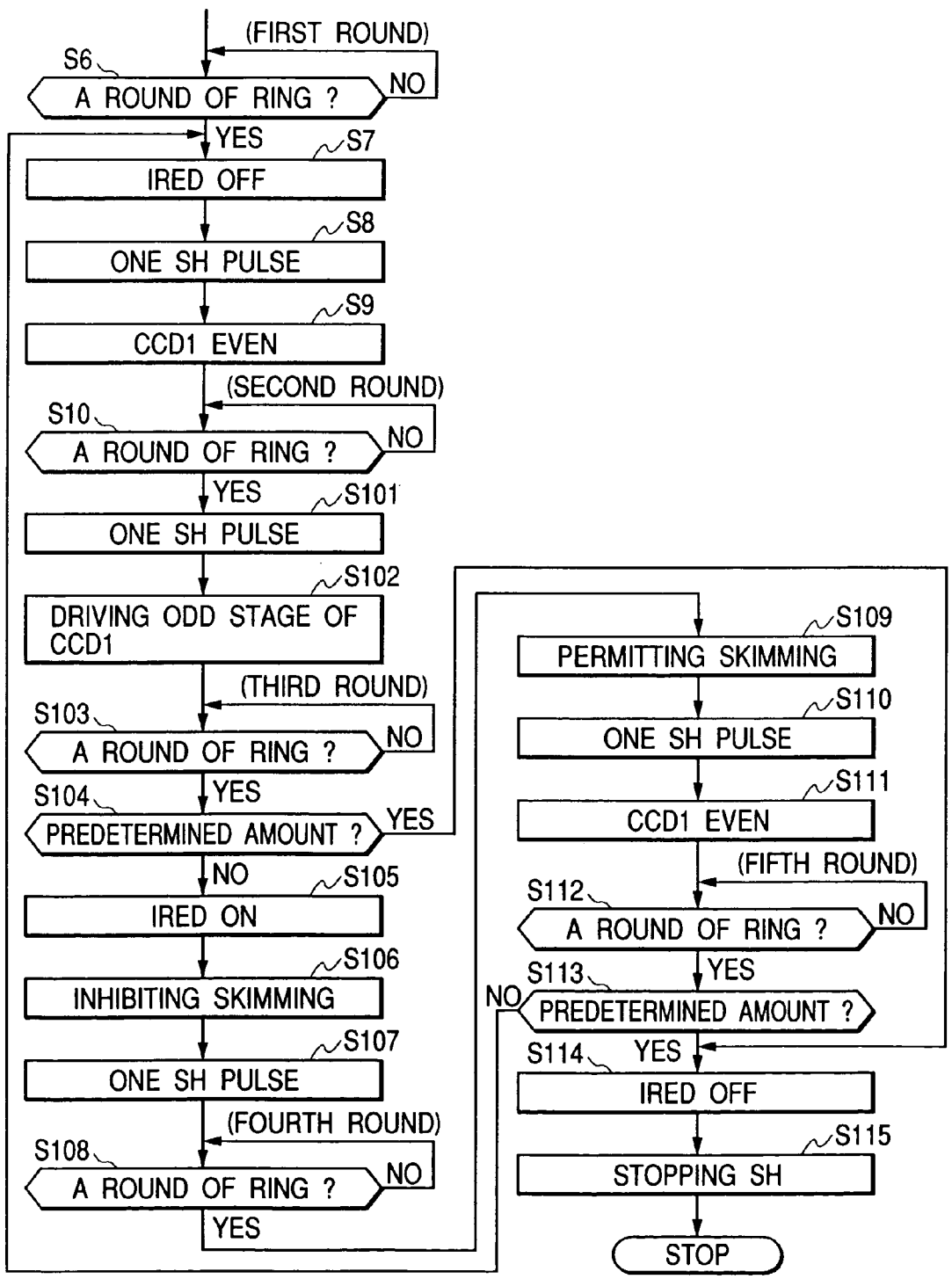
FIG. 10 is a flow chart of the second embodiment of the present invention.

FIG. 10 is a flow chart showing the second embodiment of the present invention. The arrangement of the light-receiving section of this embodiment is the same as in the first embodiment shown in FIG. 5. Referring to FIG. 10, the operation until step S10 is the same as in the first embodiment.

When it is determined in step S10 that the ring has been driven by one round, the flow advances to step S101.

In step S101, one pulse is supplied to shift gates SH to transfer charges from a storage section ST to a charge transfer stage CCD1, as in step S8, and the flow advances to step S102.

In step S102, the charge transfer stage CCD1 is driven to transfer charges from the charge transfer stage CCD1 to the odd-numbered transfer stages of a charge transfer stage CCD2 at the period of the ring CCD2, as in step S9, and the flow advances to step S103.

In step S103, processing waits for one round of the ring, as in step S10, and the flow advances to step S104.

Figure 9:
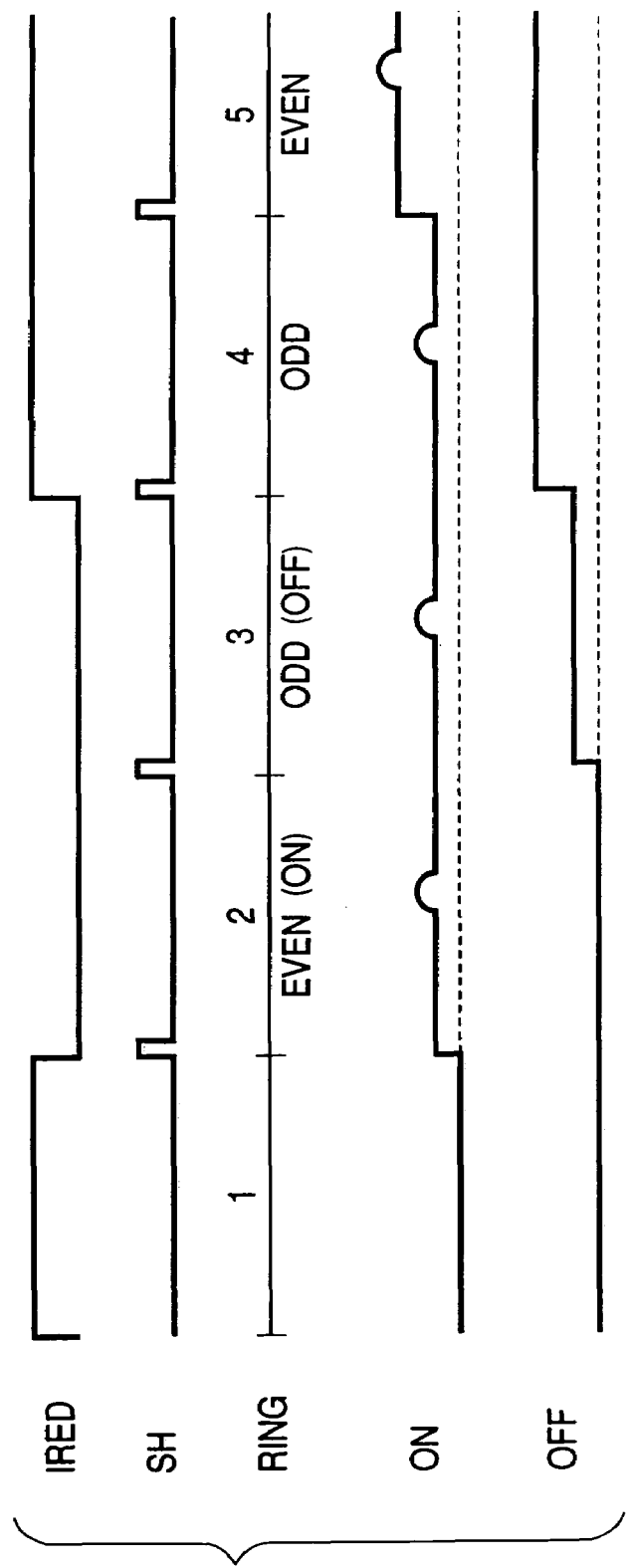
FIG. 9 is a timing chart for explaining the operation of the second embodiment of the present invention.

This operation corresponds to the third round of the ring shown in FIG. 9. At this time, both the light projection ON and OFF signals are stored.

In step S104, only charges of external light in the odd-numbered stages are subtracted from charges of projection light signals and external light in the even-numbered stages to determine whether the charges of light projection signals have reached a predetermined amount. If YES in step S104, the flow advances to step S114. If NO in step S104, the flow advances to step S105.

In step S105, the light projection means is turned on, and the flow advances to step S106.

In step S106, skimming for discarding a predetermined charge amount is inhibited, and the flow advances to step S107. The reason for this is as follows. In the fourth round of the ring shown in FIG. 9, OFF signal>ON signal. Skimming is determined by the OFF signal. Hence, skimming is inhibited to prevent undesired skimming.

In step S107, for the light projection OFF signals stored in the third round of the ring shown in FIG. 9, the same processing as in steps S101, S102, and S103 is performed. Since the first charge transfer stage CCD1 keeps to transfer charges to the odd-numbered stages, the flow advances to steps S107 and then S108.

Step S108 corresponds to the fourth round of the ring.

In step S109, skimming is permitted again because OFF signal≧ON signal holds only in rounds of a multiple of 4. The flow advances to step S110.

In steps S110 to S112, light projection ON signals are stored. Hence, the same operation as in steps S8, S9, and S10 is performed, and the flow advances to step S113. This operation corresponds to the fifth round of the ring.

In step S113, it is determined whether the charges of signals have reached a predetermined amount, as in step S104. If YES in step S113, the flow advances to step S114. If NO in step S113, the flow returns to step S7.

In step S114, the light projection means is turned off, and the flow advances to step S115.

In step S115, the shift gates SH are stopped. Steps S114 and S115 are the same as steps S16 and S17 in FIG. 8.

The photoelectric conversion apparatus described in the first or second embodiment has the following effects.

As described above, the first transfer stage occasionally transfers charges at each of the ON and OFF timings of light projection. For this reason, one storage section can be commonly used as both the light projection ON and OFF storage sections. In addition, the first transfer stage is also commonly used for both ON and OFF states.

Hence, the sensor pitch can be halved as compared to the prior art.

Since cost reduction and an increase in resolution can be realized by reducing the chip size, the apparatus can be made compact.

In addition, saturation by external light is prevented by the skimming means.

Skimming is accurately determined when charges in the light projection OFF state go ahead of those in the light projection ON state in a pair of pixels in the second transfer stage. Signals in the light projection OFF state are added to light projection ON pixels. For this reason, skimming of charges of external light must be determined by light projection OFF pixels. This provides an effect of accurately determining skimming.

When storage is started at the light projection ON timing, skimming determination control is simplified. More specifically, charges have a relationship, light projection ON signal≧OFF signal in the second charge transfer means. Hence, the skimming determination means always determine and control skimming.

In case of light projection ON signal<OFF signal and when skimming is performed by determining by the light projection OFF signals, the number of times of external light storage in the light projection ON state is too small, and charges corresponding to the signals may also be discarded. This effect simplifies skimming determination control.

When the light projection ON and OFF timings are alternated such as ON/OFF/OFF/ON, the numbers of rounds of transfer in the second charge transfer means can be finally equalized. With this arrangement, the light projection ON and OFF signals are similarly influenced by the transfer efficiency, so the influence is canceled. With this effect, the influence of the transfer efficiency has no difference between the light projection ON and OFF states.

When light projection ON and OFF states alternate such as ON/OFF/OFF/ON, and in case of ON signal<OFF signal in the second charge transfer stage, skimming control is inhibited to normally operate the apparatus. With this effect, skimming can be accurately determined.

A distance measuring apparatus using the apparatus described in the first or second embodiment will be described next. Two apparatuses shown in FIG. 5 described in the first or second embodiment are used. The difference signal between a signal in the light projection ON state and a signal in the light projection OFF state is obtained from each apparatus. On the basis of the difference signals output from the apparatuses, pixels of the sensors of the apparatus, which are receiving light, are detected, thereby obtaining the distance to the object.

Many widely different embodiments of the present invention may be constructed without departing from the spirit and scope of the present invention. It should be understood that the present invention is not limited to the specific embodiments described in the specification, except as defined in the appended claims.

What is claimed is:

1. A photoelectric conversion apparatus comprising:
   a sensor array for receiving reflected light from an object;
   a first transfer unit arranged to transfer signals from said sensor array; and
   a ring-shaped second transfer unit arranged to integrate the signals from said first transfer unit,
   wherein said first transfer unit continuously transfers first signals from said sensor array in a light projection ON state to said ring-shaped second transfer unit, and alternately continuously transfers second signals from said sensor array in a light projection OFF state to said ring-shaped second transfer unit, at different timings respectively, wherein a transfer frequency of said ring-shaped second transfer unit is higher than that of said first transfer unit, wherein said second transfer unit comprises a skimming unit arranged to determine skimming on the basis of the second signal, and a pixel for which skimming is determined performs skimming by a combination of light projection ON and OFF states, and wherein skimming is inhibited when a light projection OFF signal goes ahead of a light projection ON signal in integration of the signal in said second transfer unit.

2. An apparatus according to claim 1, wherein each timing of said first transfer unit has a phase different from that of said second transfer unit.

3. An apparatus according to claim 1, wherein integration starts from the first signal.

4. An apparatus according to claim 1, wherein light projection repeatedly alternates the ON and OFF states.

* * * * *